Patented Nov. 24, 1942

2,302,718

UNITED STATES PATENT OFFICE 2,302,718

PIGMENT AND METHOD OF PREPARING SAME

Robert F. Ruthruff, Nutley, N. J.

No Drawing. Application May 3, 1939,
Serial No. 271,513

2 Claims. (Cl. 106—297)

This invention relates to the preparation of pigments.

One object of this invention is to provide a simple and convenient method for forming brilliant and stable pigments. A further object of this invention is to provide a simple and convenient method for forming a series of brilliant and stable pigments of differing shades and tinctorial powers. An additional object of this invention is to provide a simple and convenient method for preparing homogeneous mixed crystals, the same being suitable for use as pigments. Further objects of this invention will become apparent from the following description.

This invention depends upon the fact that numerous precipitates, for example barium sulfate and lead sulfate, when freshly precipitated exhibit properties differing materially from those shown by the respective substances when old. When substances such as barium sulfate or lead sulfate are freshly precipitated they are obtained in the form of microscopic crystals which are more or less perfect in form. It is believed that each of these microscopic crystals consists of myriads of small highly imperfect crystals separated by capillaries of little larger than molecular dimensions. These small highly imperfect crystals lie beyond the resolving power of even the most powerful microscope. Due to the imperfection of these extremely small amicroscopic crystals in the microscopic aggregates the lattices of the individual particles are in a strained state and hence tend to perfect themselves as rapidly as possible. This is believed to be accomplished by solution of positive and negative ions from points on the strained lattice having an abnormally high solution pressure followed by reprecipitation onto other points of the lattice having abnormally low solution pressure. The reprecipitation may occur on another portion of the same lattice as that from which the ions were originally obtained or on the lattice of another particle, the liquid in the previously mentioned capillaries acting as the transport medium for the ions. This process occurs quite rapidly. In many cases, for example, when dealing with lead or barium sulfates the process occurs with little or no change in the size or form of the microscopic aggregate of these amicroscopic particles. Certain other precipitates however exhibit a relatively rapid decrease in external surface during this process, silver chloride being an example. Hereafter, in this description, the above described process shall be termed "perfection." Coincidental with the process of perfection but proceeding at a much lower rate is another process whereby the microscopic crystals increase in size either by the coalescence of two or more crystals to form a larger particle or by the larger microscopic crystals growing at the expense of the smaller so that the latter gradually disappear. As mentioned, the second process, which hereafter shall be termed "ripening," is much slower than perfection so that when perfection is practically complete, ripening has progressed to a very small extent. It is evident that the bulk solution surrounding the microscopic crystals is concerned with ion transport in ripening while liquid in the previously mentioned capillaries of little more than molecular dimensions is concerned with ion transport in perfection. In many applications the phenomenon of ripening is of greatest importance. For example, in the quantitative determination of sulfate by precipitation as barium sulfate, the precipitate is usually digested for an hour or two just below boiling temperature and in the presence of the mother liquor to promote ripening and thus improve the filtering characteristics of the barium sulfate. In this process perfection is practically complete before ripening has become perceptible so that the precipitate as filtered has long since perfected itself. In the present invention the ripening process is of relatively little importance; this invention takes advantage of the generally unrecognized phenomenon of perfection. However, ripening is applied at times in the practice of the instant invention for reasons that will be described hereinafter.

While the above explanation is believed to be a substantially correct explanation of the mechanism of perfection and ripening it is to be understood that this is theory only and in no way limits the scope of the instant invention.

While it is generally considered that insoluble precipitates such as barium sulfate, lead sulfate, calcium oxalate and the like are quite unreactive it will be evident to those skilled in the art that during the perfection of precipitates these may well be in a highly reactive form and this is in fact found to be the case.

During the perfection process, points on the lattice of the individual, imperfect, amicroscopic crystals which have a high solution pressure discharge ions into the capillaries separating these crystals while points on the lattice having a low solution pressure take up ions from the mother liquor resulting in a gradual perfection of the individual amicroscopic crystals. As will be evident to those skilled in the art the points on the lattice having a low solution pressure will take up a foreign ion, that is an ion not found in the lattice of the original precipitate, from the mother liquor providing that said foreign ion satisfies the requirements for isomorphic substitution in the existing lattice. If such a foreign ion is taken up a mixed crystal forms. In general the foreign ion can be taken into the lattice when the chemical building types of the original lattice ion and the foreign ion are the same, when the lattice types of the two ions are the same and when the lattice constants are of the same order of magnitude. In other words, for a foreign ion to be taken up by the existing lattice it must fit without too much distortion either of itself or of the existing lattice into a "hole" in the existing lattice. This can perhaps better be explained by citing a few examples of such isomorphic substitutions. Taking barium sulfate as an example of the existing lattice, sulfate ions can be isomorphically replaced by permanganate ions, molybdate ions, chromate ions or borofluoride ions while conversely the barium ions may be isomorphically replaced by lead ions. Similarly, with calcium carbonate, the nitrate ion can replace carbonate while with calcium oxalate the barium ion can isomorphically replace the calcium ion. Likewise, bromide ion can replace the chloride ion in silver chloride.

Briefly stated, pigments are made according to this invention by forming a precipitate and then before perfection has had an opportunity to proceed to any appreciable extent surrounding said precipitate by a solution of a foreign ion or ions capable of isomorphic substitution in the lattice of said precipitate during the perfection process. While isomorphic substitution will occur with a perfected crystal the process is so slow that equilibrium is not reached within reasonable periods. It is evident however that during perfection, which involves a rapid and repeated exchange of ions, isomorphic substitution of foreign ions proceeds rapidly to completion.

Before proceeding with detailed examples illustrating the practice of the instant invention a few general principles of operating technique will be considered.

It is evident that the success achieved by the practice of this invention depends largely upon the speed with which the precipitate is contacted with the foreign ion or ions. To do this as rapidly as possible it is necessary to accomplish the precipitation and the contacting of the precipitate with the foreign ion or ions quickly. To achieve a speedy formation of the precipitate it is generally necessary to work with moderately concentrated solutions. For example, if it is desired to form lead sulfate and to this end a given volume of an 0.025 molar solution of a soluble lead salt such as lead nitrate is mixed with an approximately equal volume of a 0.025 molar solution of a soluble sulfate such as sodium sulfate, the desired precipitate is not obtained for an appreciable period of time, which period, while measured in seconds, is sufficient to bring about considerable perfection in the visible precipitate finally formed and thus considerably diminish the speed and amount of subsequent isomorphic substitution. In general, it is advisable to work with solutions having a strength of from 0.1 molar to 0.5 molar or stronger, depending of course upon the solubility of the reactants and other considerations. Obviously after the precipitate has once formed the suspension may be diluted to any extent desired.

When working with solutions of the preferred concentrations mentioned above an immediate precipitate is obtained by adding one reactant to the other. However, when operating in this way, especially on the large scale, an appreciable length of time is necessary for the addition of the one reactant to the other and accordingly a precipitate is obtained, the individual particles of which have different ages and have accordingly undergone perfection to differing degrees and hence will show varying powers of isomorphic substitution with the foreign ion or ions. To overcome this disadvantage it is preferable to mix the two reactants simultaneously, adding the two at approximately equal rates chemically, and immediately passing the resulting suspension to the vessel containing the foreign ion or ions. This may be accomplished, for example, by passing the solutions of the two reactants separately but simultaneously to a small vessel that is rapidly stirred and has a bottom orifice of such a size that the flow of suspension from this orifice equals the rate of addition of the two reactants to the vessel. Obviously, at the start, this orifice is closed for the time necessary to build up a supply of suspension in the mixing vessel. During operation the orifice discharges to a larger vessel containing the foreign ion or ions. Or, if desired, the two solutions containing the ions that are to unite with the formation of the desired precipitate may be passed separately to the bottom of a small vessel provided with an efficient agitation means. Overflow from this vessel passes continuously to a larger vessel containing the foreign ion or ions in solution. Or, one reactant may be flowed through a pipe or similar device while the second is introduced into the flowing stream near the extremity of said pipe, the mixture then passing through one or more cone mixers or similar devices if desired and then discharging into the vessel containing the foreign ion or ions. By all these processes a fresh precipitate and furthermore a precipitate in which all particles have practically the same age is obtained. Other means for accomplishing the same ends will be apparent to those skilled in the art.

Because of the necessity of contacting the precipitate with the foreign ion or ions before perfection of the precipitate has proceeded to an appreciable degree, at first sight it would appear preferable to mix a solution of one reactant with a solution of the other reactant which contains in addition the desired foreign ion or ions in solution. In this way the precipitate would form directly in the presence of the foreign ion or ions and presumably improved results would follow. Actually, this method is preferable but unfortunately it is of extremely limited application, being applicable only when the foreign ion or ions themselves form no precipitate with the added reactant. For example, if it is desired to replace isomorphically a part of the carbonate ion in calcium carbonate with nitrate ion it is preferable to mix a solution containing sodium carbonate, for example, with one containing calcium nitrate and sodium nitrate for example, or, if desired, one containing only calcium nitrate. In this case it is evident that the foreign nitrate ion does not form an insoluble precipitate with either the calcium ion or the sodium ion and hence the method is applicable and preferable. Unfortunately however the resulting mixed precipitate has little or no utility as a pigment. This simplified method may also be used for isomorphically substituting permanganate ion for sulfate ion in barium sulfate by mixing a solution of a soluble sulfate with a solution containing both barium ions and permanganate ions, formed, if desired, by dissolving barium permanganate in water. Here again the resulting material, while deeply colored and exhibiting other interesting properties, has little or no utility as a pigment.

In the more general case however the above described simplified method cannot be employed with success. For example, if it is desired to isomorphically substitute part of the sulfate ions in barium sulfate with chromate ions and a solution containing, for example, sodium sulfate and sodium chromate is mixed with one containing for example barium nitrate a heterogeneous mixed precipitate of barium chromate and barium sulfate is obtained. Obviously, from a theoretical standpoint, the heterogeneous mixture of barium chromate and barium sulfate should eventually form the desired homogeneous mixed crystals but actually, due to the extreme rapidity of the perfection process complete conversion to the homogeneous mixed precipitate is never achieved.

Due to the necessity, under ordinary circumstances, of separately forming the precipitate and then contacting said precipitate with the foreign ion or ions which in turn necessitates that said contacting shall occur before appreciable perfection of the precipitate has taken place, methods for decreasing the rate of perfection will now be briefly considered. As is well known in the art, the solubility of a given precipitate is less in a mother liquor containing one or the other of the ions composing the precipitate than in pure water. This is known as the common ion effect. Perfection which occurs through solution of ions from the lattice of the precipitate followed by reprecipitation is naturally most rapid when solubility is maximum. Accordingly a precipitate formed by the mixing of exactly the theoretical amounts of the two reactants perfects much more rapidly than one precipitated in the presence of an excess of one or the other of the two reactants. In general the reactant in excess makes little difference on the rate of perfection although with barium sulfate the precipitate perfects more rapidly in the presence of excess sulfate than when barium is in excess, the most rapid perfection being observed when neither ion is in excess. Based on previous considerations it is evident that preferably the mother liquor contains a slight excess of one or the other of the precipitating ions. Also, purely chemical considerations will indicate that perfection will proceed more rapidly at high temperatures than at low so that precipitation and contacting with the foreign ion or ions is best done at ordinary temperatures.

In contacting the precipitate with the solution containing the foreign ion or ions it is advisable to maintain a reasonable concentration of said ion or ions in the solution to hasten the formation of homogeneous mixed crystals. If the concentration of the foreign ion or ions is high the isomorphically replaced ions from the precipitate do not appreciably decrease the concentration of the foreign ion or ions and accordingly the rate of isomorphic substitution remains essentially constant until equilibrium is reached. While, in general, concentrated solutions of the foreign ion or ions are used this is not necessarily always true. For example, in the preparation of chrome yellow it may be desirable to stabilize the lead chromate by isomorphically substituting sulfate ion in the lattice. However, since little sulfate is needed for stabilization, the unperfected chromate is stirred with a rather dilute, for example, 0.01 molar, solution of a soluble sulfate. Also, since the substitution occurs through exchange of ions within the capillaries separating the amicroscopic crystals it is essential that the composition of the liquid in these capillaries be maintained as nearly as possible similar to that of the bulk of the solution. This is best accomplished by agitating the suspension during the period of perfection so that each microscopic aggregate is at all times surrounded by fresh mother liquor containing the foreign ion or ions.

Fundamentally the instant invention depends upon the formation of homogeneous mixed crystals by isomorphic substitution of a foreign ion or ions into the lattice of the precipitate during the perfection thereof. However in certain cases it is necessary or desirable to further process the products by ripening or otherwise to improve the physical form, shade or color of the pigment. Ripening of said pigments may be accomplished, for example, by digesting in the presence of the mother liquor at or near the boiling point. Alternatively, in many cases, ripening may be accomplished by treating the pigment at ordinary temperatures in the presence of the mother liquor which has been acidified or made alkaline depending upon the exact nature of the pigment. The pigment, being more soluble in the acidified or alkaline mother liquor (as the case may be) than in the said mother liquor itself, ripens at a rapid rate. Often other phenomena are observed when the pigment is contacted with the acidified or alkaline mother liquor in that the crystal form or chemical composition of the pigment is changed, not infrequently resulting in a desirable change in color or shade. In such cases the pigment may be contacted with the acidified or alkaline mother liquor until the desired color has developed following which the medium is brought back to neutrality or to its original pH and the modified pigment is worked up as usual.

Having considered briefly the major points of operating technique in the practice of the instant invention specific examples for the preparation of representative pigments will now be given. These examples are illustrative only and in no way limit the scope of the instant invention.

*Example 1.*—About 1.1 volumes of a solution containing some 26 grams barium nitrate per liter and about one volume of a solution containing some 27 grams sodium sulfate heptahydrate per liter are separately heated approximately to the boiling point. The two solutions are mixed and the resulting suspension is passed directly to a heated solution containing about 33 grams lead nitrate per liter. The resulting mixture is agitated for a short time following which the precipitate is removed by filtration or other means, is washed and dried. A white pigment is obtained containing in the neighborhood of 13 mole percent lead sulfate and 87 mole percent barium sulfate.

By carrying out the above preparation at room temperature a similar product is obtained but the suspension of barium sulfate must be agitated in the presence of lead nitrate solution for a much longer period to obtain a homogeneous product.

*Example 2.*—Two volumes of a solution containing about 27 grams sodium sulfate heptahydrate per liter and one volume of a solution containing about 26 grams barium nitrate per liter are contacted with one another and the resulting suspension is passed immediately to seven volumes of a solution containing about 5 grams sodium chromate decahydrate per liter. After stirring for 8 to 24 hours or longer the final precipitate is separated from the mother liquor, is washed and dried. A yellow pigment results which contains approximately 33 mole percent barium chromate and 67 mole percent barium sulfate.

*Example 3.*—The procedure is exactly similar to that described under Example 2 except that prior to separating the precipitate from the mother liquor, the suspension is heated to about 100° C. and maintained at this level for one hour or longer. The final resulting precipitate has a larger particle size and a more brilliant color than that prepared according to the preceeding example. Or, if desired, the pigment made in accord with Example 2, after separation from the mother liquor and either before or after washing but preferably prior to drying may be ripened as described in the instant example.

*Example 4.*—The procedure is similar to that described under Example 2 except that the chromate solution contains about 1 gram sodium chromate decahydrate per liter. The resulting pigment, which contains about 5 mole percent barium chromate and 95 mole percent barium sulfate, is pale yellow in color.

*Example 5.*—About 1.1 volumes of a solution containing some 33 grams lead nitrate per liter and about one volume of a solution containing some 27 grams sodium sulfate heptahydrate per liter are mixed and the resulting suspension is passed to a solution containing some 34 grams sodium chromate decahydrate per liter. The resulting mixture is stirred for about 24 hours, the precipitate is separated from the mother liquor, is washed and dried. A yellow pigment is obtained.

*Example 6.*—Exactly as in Example 5 except that prior to separating the pigment from the mother liquor, said mother liquor is made alkaline with caustic. The resulting reaction mixture is stirred until the desired color has developed, the suspension is neutralized by the addition of acid and the pigment is separated from the mother liquor, is washed and dried. A red pigment is obtained. Or, if desired, the pigment made in accord with Example 5, after separation from the mother liquor and either before or after washing but preferably prior to drying may be further treated as outlined in the instant example.

*Example 7.*—Exactly as described in Example 5 except that before separating the precipitate from the mother liquor the suspension is acidified by the addition of nitric acid (or similar reagent. Sufficient acid is added to give a pH of from about 2 to 5. The suspension is stirred until the desired color is obtained following which the solution is restored to the original pH with caustic. The precipitate is separated from the mother liquor, is washed and dried. A yellow pigment with a distinct red cast is obtained. Or, if desired, the pigment made in accord with Example 5, after separation from the mother liquor and either before or after washing but preferably before drying may be further treated as outlined in the instant example.

*Example 8.*—About 1.1 volumes of a solution containing some 26 grams barium nitrate per liter and one volume about of a solution containing some 27 grams sodium sulfate heptahydrate per liter are mixed and the resulting suspension is passed to one volume of a solution containing about 12 grams sodium molybdate dihydrate and some 17 grams sodium chromate decahydrate per liter. The resulting suspension is stirred for about 24 hours, the pigment is separated from the mother liquor, is washed and dried.

*Example 9.*—About 1.1 volumes of a solution containing some 33 grams lead nitrate per liter and about one volume of a solution containing some 27 grams sodium sulfate heptahydrate per liter are mixed and the resulting suspension is passed to one volume of a solution containing about 12 grams sodium molybdate dihydrate and some 17 grams sodium chromate decahydrate per liter. After stirring for about 24 hours sufficient nitric acid or similar reagent is added to give a pH of from about 2 to 5. The stirring is continued until the desired color is developed following which the suspension is restored to the original pH by the addition of caustic, the precipitate is separated from the mother liquor, is washed and dried. Pigments ranging in color from yellow to brilliant red are obtained depending on the length of the treating procedure in acid medium. Other conditions being equal, the shade of the pigment may also be varied by changing the ratio and the amounts of chromate and molybdate ions in the solution in which perfection proceeds. By increasing chromate at the expense of molybdate redder shades are obtained, other conditions being equal.

I claim:

1. In the preparation of pigments, the steps comprising mixing a solution containing lead ion with a solution containing an anion selected from the group consisting of chromate ion, molybdate ion and sulfate ion, contacting the resulting precipitate suspension before perfection of said precipitate has proceeded to an appreciable extent with a solution containing the remaining anions of said anion group and allowing perfection to proceed to substantial completion therein.

2. In the preparation of pigments, the steps comprising mixing a solution containing lead ion with a solution containing an anion selected from the group consisting of chromate ion, molybdate ion and sulfate ion, contacting the resulting precipitate suspension before perfection of said precipitate has proceeded to an appreciable extent with a solution containing the remaining anions of said anion group, allowing perfection to proceed to substantial completion therein and ripening the resulting isomorphically substituted and perfected mixed precipitate.

ROBERT F. RUTHRUFF.